United States Patent
Lee et al.

(10) Patent No.: US 12,081,652 B2
(45) Date of Patent: Sep. 3, 2024

(54) DEVICE ESTABLISHING SECURITY SESSION FOR V2X SERVICE

(71) Applicant: LG ELECTRONICS INC., Seoul (KR)

(72) Inventors: Songgun Lee, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 214 days.

(21) Appl. No.: 17/770,260

(22) PCT Filed: Jul. 1, 2020

(86) PCT No.: PCT/KR2020/008579
§ 371 (c)(1),
(2) Date: Apr. 19, 2022

(87) PCT Pub. No.: WO2022/004915
PCT Pub. Date: Jan. 6, 2022

(65) Prior Publication Data
US 2022/0399998 A1    Dec. 15, 2022

(51) Int. Cl.
*H04L 9/08*  (2006.01)
*H04L 9/32*  (2006.01)

(52) U.S. Cl.
CPC .......... *H04L 9/0825* (2013.01); *H04L 9/0861* (2013.01); *H04L 9/3263* (2013.01)

(58) Field of Classification Search
CPC ........ H04L 9/0825; H04L 9/0861; H04L 9/63
See application file for complete search history.

(56) References Cited

U.S. PATENT DOCUMENTS

| 8,214,890 | B2 | 7/2012 | Kirovski et al. | |
|---|---|---|---|---|
| 2010/0031042 | A1* | 2/2010 | Di Crescenzo | ........... H04L 9/32 713/168 |
| 2016/0140842 | A1* | 5/2016 | Park | ..................... G08G 1/0112 340/905 |
| 2018/0278604 | A1* | 9/2018 | Yang | ..................... H04L 63/068 |
| 2019/0223008 | A1* | 7/2019 | Vanderveen | .......... H04L 9/0825 |

(Continued)

FOREIGN PATENT DOCUMENTS

| EP | 3349514 A1 * | 2/2016 | ............ H04W 52/02 |
|---|---|---|---|
| KR | 10-1584001 | 1/2016 | |

(Continued)

OTHER PUBLICATIONS

PCT International Application No. PCT/KR2020/008579, International Search Report dated Mar. 15, 2021, 6 pages.

(Continued)

*Primary Examiner* — Darshan I Dhruv
(74) *Attorney, Agent, or Firm* — LEE, HONG, DEGERMAN, KANG & WAIMEY

(57) ABSTRACT

Provided is a device establishing a security session for a vehicle-to-everything (V2X) service. The device transmits a ping request message requesting establishment of the security session to a V2X server. The ping request message includes a certificate based on the Institute of Electrical and Electronics Engineers (IEEE) 1609.2 and a session identifier (ID) for the security session. The device receives, from the V2X server, a ping response message as a response to the ping request message.

12 Claims, 7 Drawing Sheets

(56) References Cited

U.S. PATENT DOCUMENTS

| | | | | |
|---|---|---|---|---|
| 2020/0127820 A1* | 4/2020 | Misoczki | ............ | H04L 63/0442 |
| 2020/0162901 A1* | 5/2020 | Liu | ......................... | H04W 4/06 |
| 2020/0280842 A1* | 9/2020 | Liu | ....................... | H04L 9/3268 |
| 2020/0365012 A1* | 11/2020 | Zagajac | ............ | G08G 1/096783 |
| 2021/0119800 A1* | 4/2021 | Jung | ..................... | H04L 9/3242 |
| 2022/0116465 A1* | 4/2022 | Descombes | ......... | G06Q 30/0259 |

FOREIGN PATENT DOCUMENTS

| | | | | |
|---|---|---|---|---|
| KR | 10-1592788 | | 2/2016 | |
| KR | 10-2018-0044992 | | 5/2018 | |
| KR | 10-2018-0108910 | | 10/2018 | |
| WO | WO-2016118202 A1 * | 7/2016 | ......... | H04L 63/0428 |

OTHER PUBLICATIONS

3rd Generation Partnership Project; Technical Specification Group Services and System Aspects; Proximity-based Services (ProSe); Security aspects (Release 15), 3GPP TS 33.303 v15.0.0, Jun. 2018, 90 pages.

* cited by examiner

: FIRST SUBSCRIPTION AREA

: SECOND SUBSCRIPTION AREA

DEVICE ESTABLISHING SECURITY SESSION FOR V2X SERVICE

CROSS-REFERENCE TO RELATED APPLICATIONS

This application is the National Stage filing under 35 U.S.C. 371 of International Application No. PCT/KR2020/008579, filed on Jul. 1, 2020, contents of which are hereby incorporated by reference herein its entirety.

BACKGROUND

Field

The present disclosure relates to a method for vehicle-to-everything (V2X) service and a device using the same.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is the communication standard protocol based on IEEE 802.11p. Cellular-V2X (C-V2X) is the communication standard protocol based on cellular communication protocol of 3GPP. In general, V2X has focused on vehicle safety through direct communication between vehicles, but recently V2X includes vehicle-to-infrastructure communication for communicating with peripheral devices via a network.

Attempts are being made to extend V2X technology to be applied to pedestrians and other electronic devices rather than simply used for vehicle safety such as vehicle-to-vehicle and vehicle-to-peripheral devices.

SUMMARY

The present disclosure provides relates to a method for vehicle-to-everything (V2X) service and a device using the same.

In an aspect, a device for establishing security session for vehicle-to-everything (V2X) service includes a processor and a memory operatively coupled with the processor and configured to store instructions that, when executed by the processor, cause the device to perform functions. The functions includes transmitting, to a V2X server, a ping request message for requesting an establishment of a security session, the ping request message including a certificate based on Institute of Electrical and Electronics Engineers (IEEE) 1609.2 and a session identifier (ID) for the security session, receiving, from the V2X server, a ping response message as a response to the ping request message, the ping response message including the session ID and a symmetric key, and transmitting, to the V2X server, a subscription request message for requesting a subscription of the V2X service. The subscription request message is encrypted based on the session ID and the symmetric key.

In another aspect, a non-transitory computer-readable medium having computer-readable instructions stored thereon that are executable by a processor to transmit, to a V2X server, a ping request message for requesting an establishment of a security session, the ping request message including a certificate based on Institute of Electrical and Electronics Engineers (IEEE) 1609.2 and a session identifier (ID) for the security session, receive, from the V2X server, a ping response message as a response to the ping request message, the ping response message including the session ID and a symmetric key, and transmit, to the V2X server, a subscription request message for requesting a subscription of the V2X service. The subscription request message is encrypted based on the session ID and the symmetric key.

It is possible to provide V2X services to more diverse users as well as vehicles, and to ensure security and anonymity.

DESCRIPTION OF EXEMPLARY EMBODIMENTS

Figure 1:
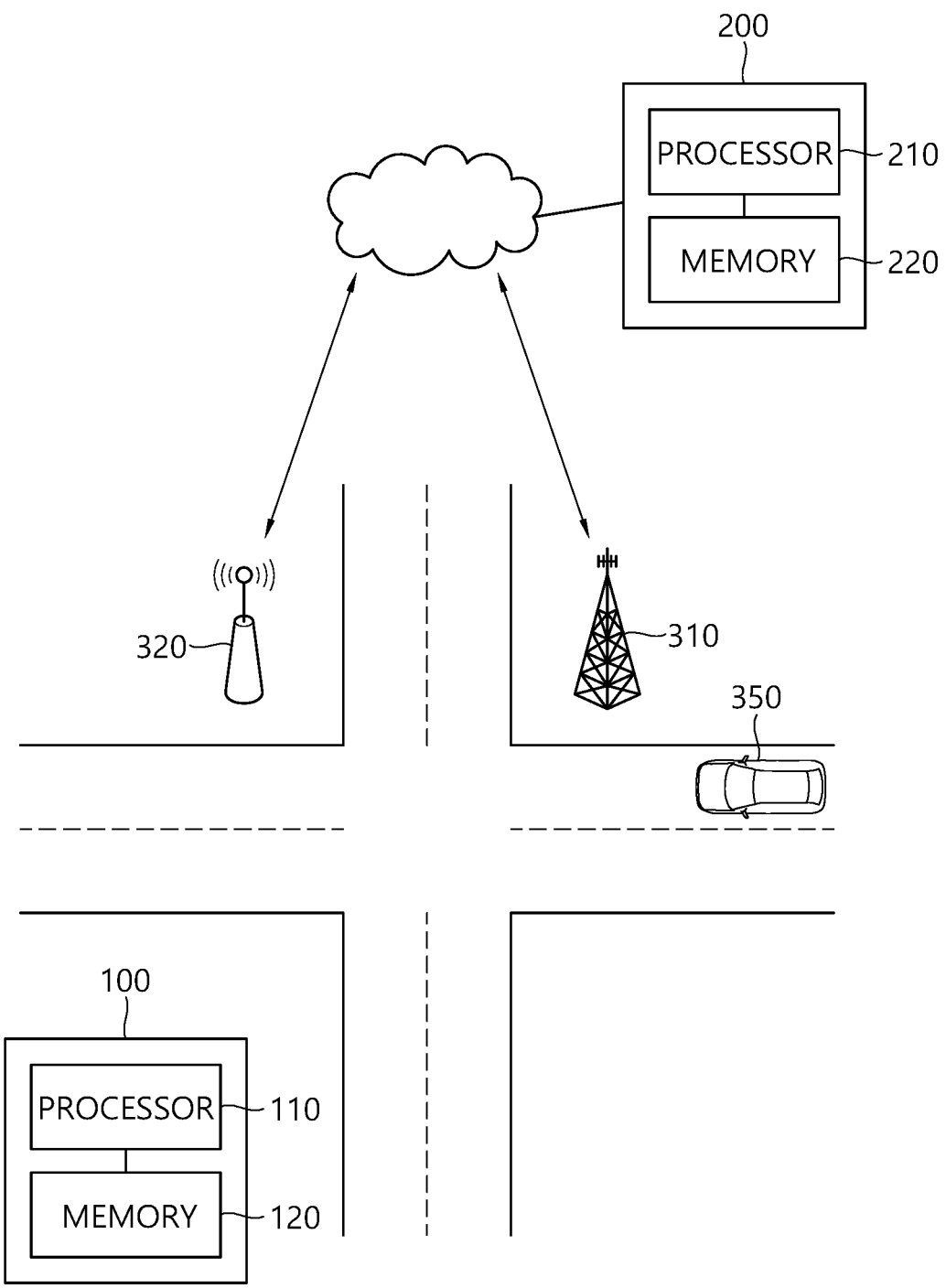
FIG. 1 shows a system to which an embodiment of the present specification is applied.

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., may be used to describe various elements, but the elements are not limited by the terms. The above terms are used only for the purpose of distinguishing one component from another.

When an element is referred to as being "connected" or "coupled" to another element, it is understood that it may be directly connected or coupled to the other element, but other elements may exist in between. On the other hand, when it is mentioned that a certain element is "directly connected" or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification is defined as a means of transport traveling on a road or track. Vehicles may include automobiles, ships, aircraft, trains, motorcycles, bicycles, and the like. The vehicle may include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification refers to a device that provides V2X functions and V2X services to users based on software, and is also referred to as a SoftV2X device. The V2X device may be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device may be mounted on a vehicle or electronic device as an on-board unit (OBU) to provide V2X functions and services to the vehicle. A V2X device disposed inside or outside the vehicle may be connected to the vehicle through a wireless interface to provide V2X functions and V2X services to the vehicle.

FIG. 1 shows a system to which an embodiment of the present specification is applied.

A system includes a V2X device 100 and a V2X server 200. The V2X device 100 may communicate with the V2X server 200 through the base station 310 or a Road Side Unit (RSU) 320. The V2X device 100 may communicate with the base station 310, the RSU 320, a neighbor vehicle 350 and/or a neighbor V2X device using a wireless communication protocol. There is no limitation on the wireless communication protocol. The wireless communication protocol may include Dedicated Short Range Communications (DSRC), Cellular-V2X (C-V2X), WiFi, Bluetooth and/or cellular communication protocols based on 3rd Generation Partnership Project (3GPP) (e.g. Wideband Code Division Multiple Access (WCDMA), Long Term Evolution (LTE), New Radio (NR), etc.).

The V2X server 200 receives one or more V2X messages from the V2X device 100 within a managed area. The V2X server 200 may forward the one or more collected V2X messages to the subscribing V2X device 100.

The V2X message may periodically or aperiodically be transmitted to the V2X server 200 by the V2X device 100 (or RSU 320), and is a message providing status information of the V2X device 100 (or device managed by the RSU 320). For example, the V2X device 100 may transmit 10 V2X messages per second. The V2X server 200 collects V2X messages from multiple V2X devices, and forwards the V2X messages to subscribing V2X devices.

The following table shows examples of information elements included in the V2X message. Not all information elements are essential, and names are examples only. Information elements may be added/changed/deleted according to policies or circumstances.

TABLE 1

| Name | Description |
| --- | --- |
| V2X ID | A temporary identifier (ID) for identifying the V2X device sending this message. It is randomly selected by the V2X device and may be changed periodically. The size can be 4 octets. |
| Position | Indicates the location of the V2X device. May contain latitude, longitude and elevation. |
| Position Accuracy | Including the quality of various parameters used to model the accuracy of positioning. |
| Velocity | Indicates the velocity of the V2X device. |
| Heading | Indicates the current heading (direction of motion) of the V2X device. |
| Path History | defines a geometric path reflecting V2X device's movement over some period of time and/or distance |
| Acceleration | Indicates the acceleration of the V2X device. May include a set of acceleration values for three orthogonal directions of the V2X device: a longitudinal axis, a lateral axis, and a vertical axis. |
| Device Type | Indicates the type of V2X device. Example: pedestrian, automobile, bicycle, etc. |
| Publishing Area | To be described later |

The V2X message transmitted by the V2X device 100 to the V2X server 200 is called an uplink (UL) V2X message, and the V2X message transmitted by the V2X server 200 to the V2X device 100 is called a downlink (DL) V2X message.

The V2X device 100 may include a processor 110 and a memory 120. The processor 110 implements the functions of the V2X device 100 and may include one or more software modules. The V2X device 100 may further include various additional devices according to functions such as a display, a user interface, and a wireless modem.

The V2X server 200 is connected to one or more base stations 310 and/or RSU 320 and includes computing hardware that provides V2X functions and V2X services to the V2X device 100. The V2X server 200 may be a Mobile/Multi-access Edge Computing (MEC)-based server or a centralized-based server. The V2X server 200 may be called another name, such as a Geocast server or a SoftV2X server. The V2X server 200 may include a processor 210 and a memory 220. The processor 210 implements the function of the V2X server 200, and may include one or more software modules.

The processors 110 and 210 may include Application-Specific Integrated Circuits (ASICs), Central Processing Unit (CPU), Application Processor (AP), Digital Signal Processor (DSP), Digital Signal Processing Device (DSPD), Programmable Logic Device (PLD), Field Programmable Gate Array (FPGA), micro-controller, chipset, logic circuits, data processing device and/or combinations thereof. In the software implementation for the following embodiments, the software code for performing the functions described herein may be stored in the memories 120 and 220 and executed by the processors 110 and 210.

Memories 120 and 220 may store information accessible by processors 110 and 210. The information may include instructions executable by the processors 110 and 210 and/or data processed by the processor. Memories 120 and 220 may include any form of computer-readable medium operable to store information. For example, the memories 120 and 220 include read only memory (ROM), random access memory (RAM), digital video disc (DVD), optical disc, flash memory, solid state drive (SSD), hard drive and combinations thereof.

Although MQTT (Message Queuing Telemetry Transport) is used as a message protocol between the V2X device 100 and the V2X server 200, this is only an example. Advanced Message Queuing Protocol (AMQP), HyperText Transfer Protocol (HTTP), and/or vendor specific protocols may be used.

Now, setting an area for V2X service will be described in more detail. Hereinafter, a tile refers to a geographic basic unit for setting a subscription area. Hereinafter, a rectangle is shown in the form of a tile, but it is only an example. There are no restrictions on the shape of the tile, such as polygons or circles.

Figure 2:
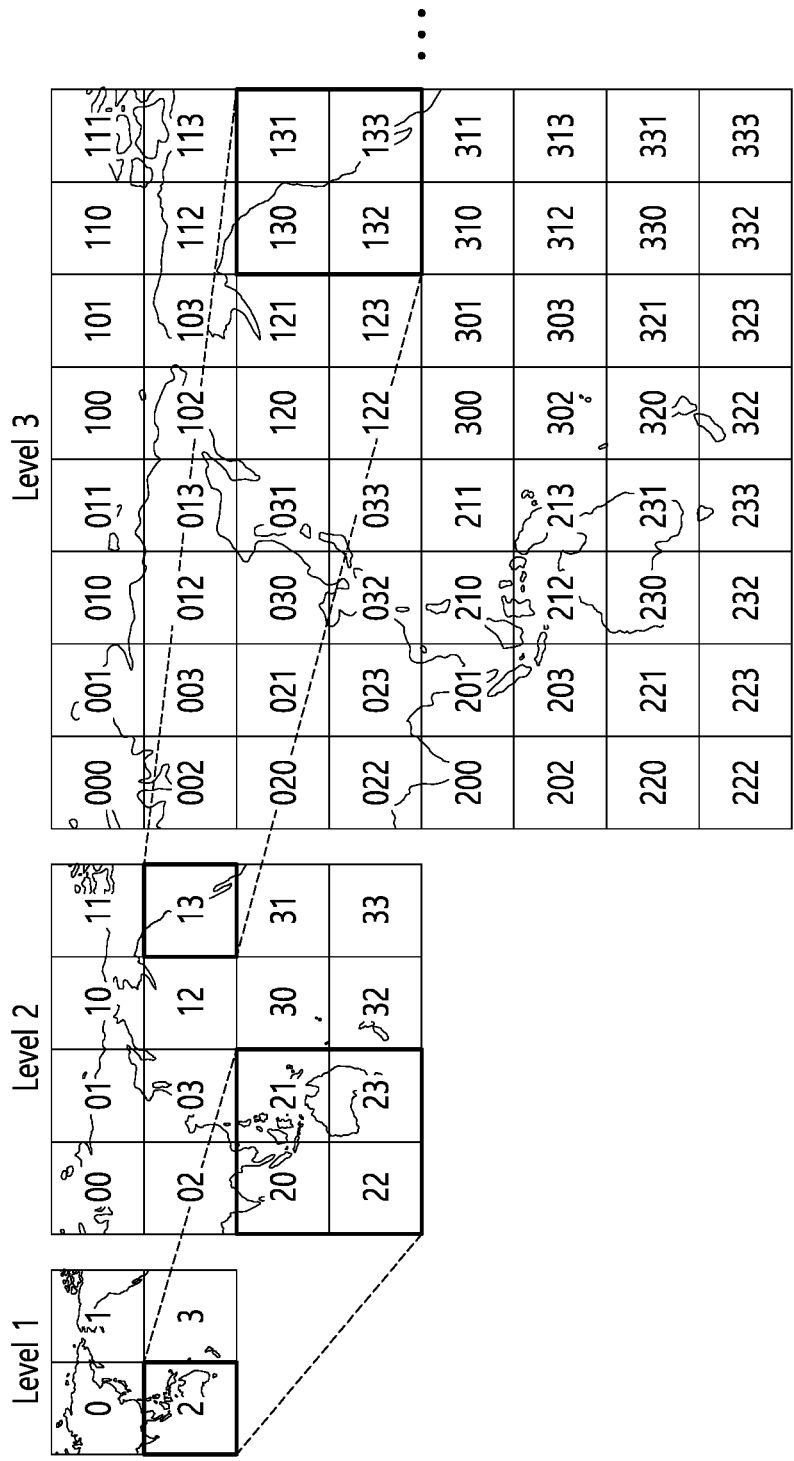
FIG. 2 shows an example of a tile using a quadtree.

FIG. 2 shows an example of a tile using a quadtree.

The quadtree represents a partition of space in two dimensions by decomposing a map (i.e. world map) into four equal quadrants, subquadrants, and so on. The size of a quadrant varies according to a zoom level, and each quadrant corresponds to a tile. Here, the case where the levels are 1, 2, and 3 is shown. The larger the level, the smaller the size of the tile. At each level, a unique ID is assigned to a tile. The tile ID may have the number of bits corresponding to the level.

The V2X device may acquire the ID of the tile in which it is located based on its location information (e.g. latitude and longitude). The V2X device and/or the V2X server may adjust the size of the area by adjusting the level according to the situation.

In the following embodiment, the area for the V2X service is defined as follows.

- Management area: The area managed by the V2X server. The management area includes one or more tiles.
- Subscription area: The area where the V2X device requests a subscription to the V2X server. The subscription area may be referred to as another name, such as a concerned area, an impact area, or a geocast area. The subscription area contains one or more tiles. The subscription area may be included in one management area, and may be defined across a plurality of management areas managed by a plurality of V2X servers.
- Publishing area: The area where the V2X device publishes V2X messages to the V2X server. The publishing area may include one tile in each level. The publishing area may indicate a tile where the V2X device is currently located. Some or all of the publishing area may overlap with the subscription area.

Figure 3:
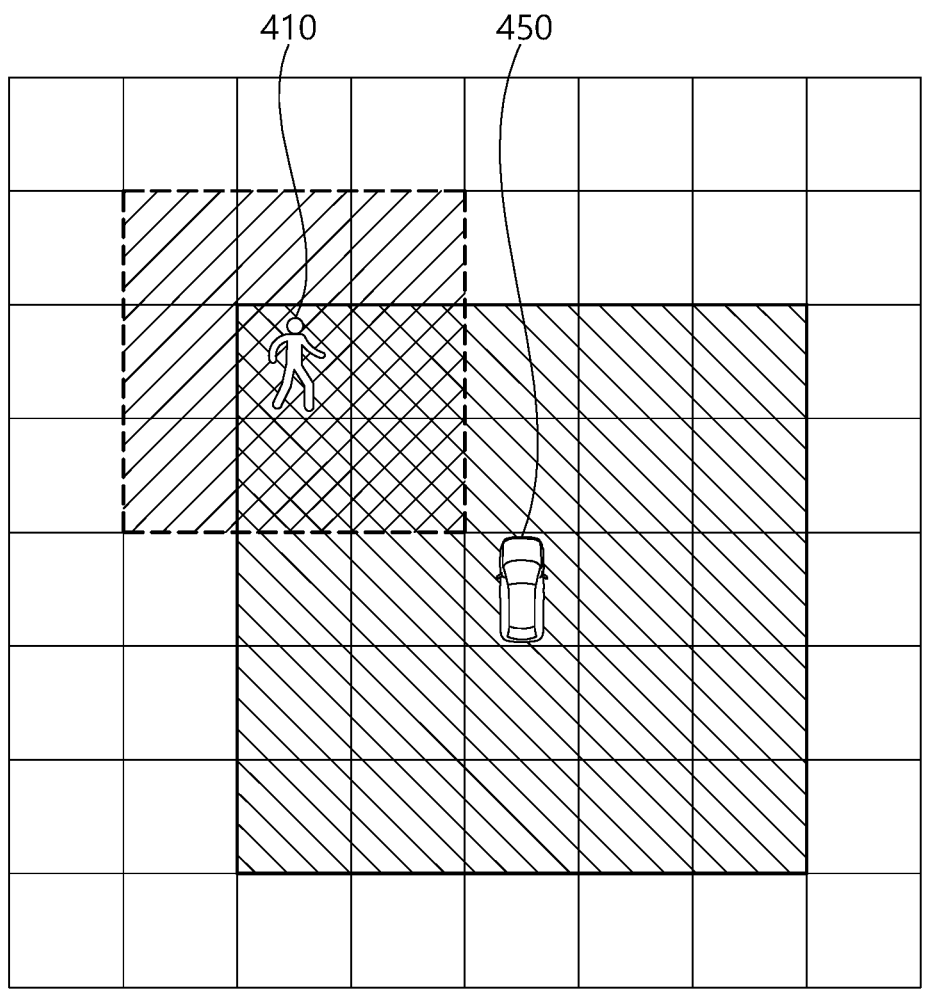
FIG. 3 shows an example in which a subscription area is set.
Figure 3:
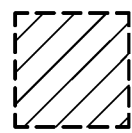
Figure 3:
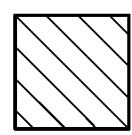

FIG. 3 shows an example in which a subscription area is set.

A first subscription area is set to the first V2X device 410, and a second subscription area is set to the second V2X device 450. Each V2X device can set/change/delete the subscription area periodically or aperiodically (e.g. when its location is changed). Each V2X device can request setting/change/deletion of the subscription area to the V2X server.

The number of tiles included in the first subscription area is 9 and the number of tiles included in the second subscription area is 25, but the number of tiles included in the subscription area or the shape of the subscription area is not limited. The subscription area may include a tile in which the V2X device is located. Alternatively, the subscription area may include one or more tiles other than a tile in which the V2X device is located.

The first V2X device 410 may generate a first V2X message and periodically send it to the V2X server. The second V2X device 450 may generate a second V2X message and periodically send it to the V2X server.

The V2X server may forward one or more V2X messages received in or around a subscription area to the V2X device related to the subscription area.

A device that sets a subscription area may be referred to as a 'subscriber device'. A device that transmits a V2X message to a V2X server can be referred to as a 'provider device'. A V2X device may be a subscriber device, a provider device, or both a subscriber device and a provider device. The V2X server may forward the V2X messages transmitted by the provider devices in the management area to the subscriber device.

The V2X server may deliver the V2X message of a provider device 'associated' to the subscription area of a subscriber device to the subscriber device. A provider device associated with a subscription area of a subscriber device may be referred to as a 'subscribed provider device'. The provider device associated with the subscription area of the subscriber device may satisfy at least one of the following conditions (i) to (iii): (i) Part or all of the publishing area of the provider device overlaps the subscription area of the subscriber device. (ii) some or all of the subscription area of the provider device overlaps the subscription area of the subscriber device; (iii) The location where the provider device transmits the V2X message is within the subscription area of the subscriber device.

According to condition (i) or (iii), the V2X server delivers V2X messages received in the first subscription area to the first V2X device 410. The V2X server delivers V2X messages received in the second subscription area to the second V2X device 450.

Since the first V2X device 410 is located in the second subscription area, the V2X server may forward the first V2X message to the second V2X device 450. The second V2X device 450 is a subscriber device, and the first V2X device 410 is a subscribed provider device.

Since the second V2X device 450 is not located in the first subscription area (which means that condition (i) or condition (iii) is not satisfied), the V2X server does not forward the second V2X message to the first V2X device 410. The second V2X device 450 is not a provider device of the first V2X device 410. If condition (ii) is considered, the second V2X device 450 may be a provider device of the first V2X device 410.

Now, the security protocol for the aforementioned V2X system will be described.

Since V2X services are based on exchanging locations or road information of V2X devices, various threats such as illegal information theft or location tracking may occur. Therefore, there is a need to prevent forgery/falsification of a message by using a secure certificate and to ensure anonymity of the user.

The well-known X.509 certificate or the Institute of Electrical and Electronics Engineers (IEEE) 1609.2 certificate is being considered for V2X service. The X.509 certificate refers to an X.509-based certificate. IEEE 1609.2 certificate refers to a certificate based on IEEE standard 1609.2 "IEEE Standard for Wireless Access in Vehicular Environments—Security Services for Applications and Management Messages". IEEE standard 1609.2b is an amendment to IEEE standard 1609.2. Unless otherwise indicated, IEEE 1609.2 includes IEEE standard 1609.2 and IEEE standard 1609.2b.

Figure 4:
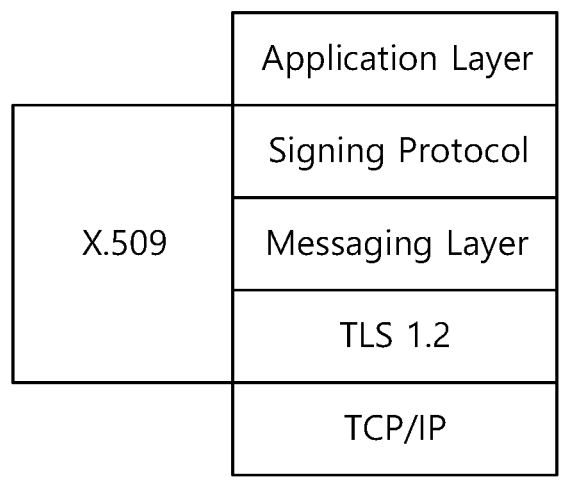
FIG. 4 shows an example of a protocol stack for an X.509 certificate.

FIG. 4 shows an example of a protocol stack for an X.509 certificate.

An application layer provides various V2X services such as road safety, drive assistance, traffic management, or infotainment. A signing protocol performs authentication using a signature. A message layer generates a message according to a predetermined message protocol for transmitting information to a target device. Although MQTT is used as a message protocol, this is only an example. AMQP, HTTP, and/or vendor specific protocols may be used.

Transport Layer Security (TLS) 1.2 refers to TLS protocol version 1.2, and is responsible for confidentiality. Transmission control protocol/internet protocol (TCP/IP) implements an IP network interface.

The X.509 certificate guarantees the authenticity and integrity of messages over TLS 1.2.

Figure 5:
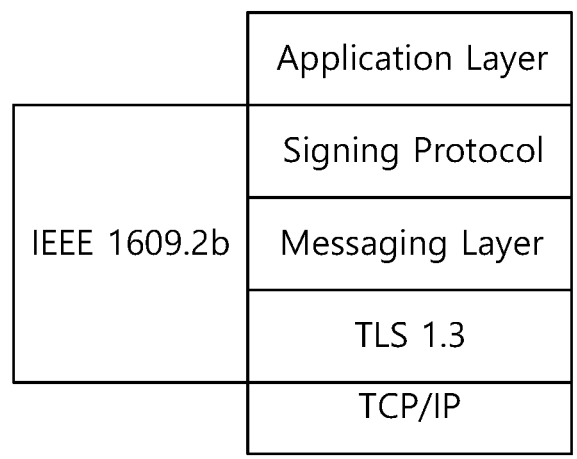
FIG. 5 shows an example of a protocol stack for IEEE1609.2 certificates.

FIG. 5 shows an example of a protocol stack for IEEE1609.2 certificates.

Compared with the protocol stack shown in FIG. 4, TLS 1.3 (TLS protocol version 1.3) and IEEE 1609.2b certificates are used. TLS 1.3 has been updated to utilize IEEE 1609.2 certificate.

The schemes according to the protocol stacks shown in FIGS. 4 and 5 apply TLS used in the conventional IP network as it is. TLS is a general-purpose security technology with good scalability so that it can be applied to all applications on the IP network, but it is not a technology optimized for V2X communication.

First, the V2X service needs to change the certificate frequently to prevent tracking. TLS requires negotiation between a client and a server through a handshake process, which may delay the establishment of a session. In order to change the certificate, the session must be re-established, so changing the certificate can take a lot of time.

Second, TLS only guarantees confidentiality and authentication when establishing a session, and a signing protocol for authentication is required for each message. Accordingly, different protocols are used for confidentiality, authentication, and certificate, increasing system complexity.

Figure 6:
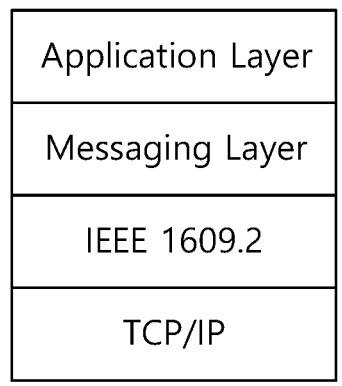
FIG. 6 shows a protocol stack for a V2X service according to an embodiment of the present specification.

FIG. 6 shows a protocol stack for a V2X service according to an embodiment of the present specification.

According to the proposed security method for V2X service, IEEE 1609.2 is used for aloo of confidentiality, authentication and certificate on the TCP/IP network. The method according to IEEE 1609.2 secures confidentiality instead of TLS, generates a signature to perform authentication, and provides a certificate.

TCP/IP network is an unicast communication. In broadcast communication, a session cannot be established between two devices (e.g. a V2X device and a V2X server), but in unicast communication, a session may be established between the two devices. When a session is established in unicast communication, confidentiality can be guaranteed by continuously maintaining the created security context.

However, IEEE 1609.2 used in conventional broadcast communication (e.g. DSRC or C-V2X) provides confidentiality, but does not establish a security session due to the nature of broadcast communication, creates a security context for each message every time, and performs encryption/decryption.

IEEE 1609.2 uses a symmetric key to encrypt information, but uses an asymmetric key technique while sharing the symmetric key. Since the asymmetric key technique takes more than 100 computation times compared to the symmetric key, it is inefficient to perform this process every time a message is sent.

Hereinafter, a method for establishing a security session based on an IEEE 1609.2 certificate on a TCP/IP network and a V2X service method using the same are proposed. The asymmetric key technique is used only when establishing a session, and the symmetric key is used later to increase the efficiency.

Figure 7:
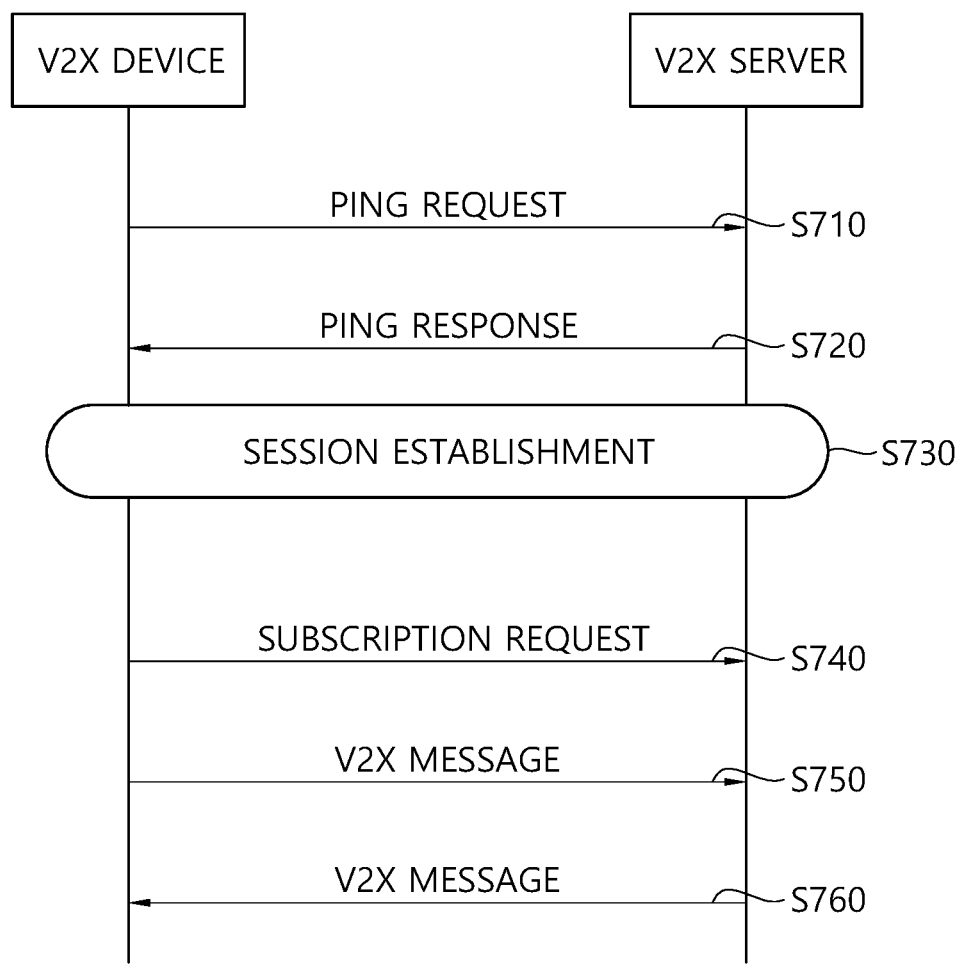
FIG. 7 shows a method for a V2X service according to an embodiment of the present specification.

FIG. 7 shows a method for a V2X service according to an embodiment of the present specification.

In step S710, the V2X device transmits a ping request message for establishing an IEEE 1609.2-based security session to the V2X server. IEEE 1609.2 may perform signing to add a signature, but may not perform encryption. Since the ping request message does not include security-related information, encryption is not required and a response can be received.

The table below is an example of a proposed IEEE 1609.2-based Abstract Syntax Notation One (ASN.1) format for the ping request message. In the following message formats, names are merely examples, and not all elements are essential.

TABLE 2

```
value1 Ieee1609Dot2Data ::= {
   protocolVersion 3,
   content signedData : {
      chashId sha256,
      tbsData {
         payload {
            data {
               protocolVersion 3,
               content unsecuredData :          // message contents
               PING REQ (MQTT)
            }
         },
         headerInfo {
            PduFunctionalType                   // message type
            secureSessionOverTCPIP
            sessionId SessionId                 // session ID
         }
      },
      signer certificate : {
         {
            ...
            toBeSigned {
               ...
               encryptionKey {
                  supportedSymmAlg : aes128Ccm,
                  publicKey                     // public key for
                  BasePublicEncryptionKey       security session
               }
               verifyKeyIndicator VerificationKeyIndicator
            }
            signature Signature
         }
      },
   signature Signature
   }
}
```

In the table above, 'content' indicates that this format is a ping request. 'PduFunctionalType' indicates the type of this message, and 'secureSessionOverTCPIP' indicates that this message is for establishing a security session over TCP/IP. 'sessionId' represents the ID of the security session.

The V2X device generates a signature using its private key and Elliptic Curve Digital Signature Algorithm (ECDSA).

In order for the V2X server to generate a symmetric key using an asymmetric key, an Elliptic Curve Integrated Encryption Scheme (ECIES) algorithm is used. The asymmetric key is a public key of the V2X device. This public key is included in the ping request.

The ASN.1 format of the following table shows an example of modification based on IEE 1609.2b.

TABLE 3

```
HeaderInfo ::= SEQUENCE {
  psid Psid,
  generationTime Time64 OPTIONAL,
  expiryTime Time64 OPTIONAL,
  generationLocation ThreeDLocation OPTIONAL,
  p2pcdLearningRequest HashedId3 OPTIONAL,
  missingCrlIdentifier MissingCrlIdentifier OPTIONAL,
  encryptionKey EncryptionKey OPTIONAL,
  ...,
  inlineP2pcdRequest SequenceOfHashedId3 OPTIONAL,
  requestedCertificate Certificate OPTIONAL,
  pduFunctionalType PduFunctionalType      // message type
  OPTIONAL
  sessionId SessionId OPTIONAL             // session ID
}
PduFunctionalType ::= INTEGER (0..255)
  tlsHandshake PduFunctionalType ::= 1
  iso21177ExtendedAuth PduFunctionalType ::= 2
  secureSessionOverTCPIP                   // establishing
  PduFunctionalType ::= 3                  security session
  pduOverTCPIP PduFunctionalType ::= 4 // message
  after security session is established
}
```

In 'PduFunctionalType', 'pduOverTCPIP' indicates a message type that is set when an encrypted message is transmitted over TCP/IP after the security session is established.

In step S720, the V2X server sends a ping response message for establishing a security session to the V2X device. When the ping request is received, the V2X server first authenticates the V2X device using a signature. More specifically, the V2X server may perform the ECDSA algorithm by using 'verifyKeyIndicator' and 'signature' in the ping request message to perform authentication of the V2X device. 'verifyKeyIndicator' includes a public key used to verify a signature generated by a certificate holder.

When the ping request message requests establishment of a security session (i.e. if the 'PduFunctionalType' of the ping request message is 'secureSessionOverTCPIP'), the V2X server transmits a ping response message for establishing the security session.

The table below is an example of the IEEE 1609.2-based ASN.1 format for the proposed ping response message.

TABLE 4

```
Ieee1609Dot2Data ::= {
  protocolVersion 3,
  content encryptedData: {
    recipients { -- Node 1
      {
        certRecipInfo {
          recipientId
          sessionId      SessionId // session ID
          encKey EciesP256EncryptedKey
          {
            v            // public key of V2X server
            c            // encrypted symmetric key
            t            // authentication tag
          }
        }
      }
    },
    ciphertext aes128ccm : {
```

TABLE 4-continued

```
      nonce
      ccmCiphertext       // signed ping response encrypted
                             by symmetric key
    }
  }
}
```

The V2X server uses its private key and ECDSA algorithm to generate a signature and then creates a signed ping response.

The V2X server generates a symmetric key using the ECIES algorithm based on the public key of the V2X device and its own private key. The V2X server encrypts the generated symmetric key. After signing, the ping response is encrypted using the symmetric key and AES-128-CCM algorithm and is transmitted as ccmCiphertext. The IEEE 1609.2 format of the signed ping response is substantially the same as the signed ping request. The 'pduFunctionalType' of the signed ping response is set to 'secureSessionOverTCPIP' and 'sessionId' is set the same as that of the ping request.

'recipientId' is a hash value of the certificate of the V2X device that is the recipient. The V2X device can determine that the received ping response message is its own, based on this hash value. The V2X device checks whether the session ID of the ping response message matches the session ID of the ping request message that the V2X device sent The ping response message may include information about the session ID, the public key of the V2X server, and the encrypted symmetric key.

The ASN.1 format of the following table shows an example of modified recipient information based on IEE 1609.2b.

TABLE 5

```
RecipientInfo ::=
  CHOICE { pskRecipInfo PreSharedKeyRecipientInfo,
    symmRecipInfo SymmRecipientInfo,
    certRecipInfo PKRecipientInfo,
    signedDataRecipInfo PKRecipientInfo,
    rekRecipInfo PKRecipientInfo
  }
  PKRecipientInfo ::= SEQUENCE {
    recipientId HashedId8,
    sessionId   SessionId OPTIONAL // session ID
    encKey EncryptedDataEncryptionKey
  }
```

When the ping response message is received, the V2X device performs the ECIES algorithm based on its private key and the public key of the V2X server, and decrypts the encrypted symmetric key through this. The V2X device can decrypt the ccmCiphertext using the obtained symmetric key and AES-128-CCM algorithm to obtain a signed ping response.

The V2X device can perform server authentication by performing the ECDSA algorithm based on the server certificate (i.e. verifyKeyIndicator and Signature) in the signed ping response.

In step S730, according to the above process, the V2X device and the V2X server may share the session ID and the symmetric key, and the security session is established. After the security session is established, subsequent messages are encrypted based on the session ID and the symmetric key. ECIES which is an asymmetric key method requiring a lot of calculations is not used for encryption, and a symmetric key method is used for encryption. Accordingly, the computation time for encryption can be reduced, and system complexity can be lowered.

The table below is an example of a proposed IEEE 1609.2-based ASN.1 format for a signed message.

TABLE 6

```
Ieee1609Dot2Data ::= {
    protocolVersion 3,
    content encryptedData: {
        recipients {
            {
                sessionSharedKey {
                    sessionId    SessionId      // session ID
                    recipientId  HashedId8,     // certificate ID
                                                    of recipient
                    encKey       HashedId8      // part of symmetric key
                }
            }
        }
    }
    ciphertext aes128ccm : {
        nonce
        ccmCiphertext               // contents of signed
                                       message encrypted
                                       by symmetric key
    }
}
}
```

The functionalPduType of the signed message is set to pduOverTCPIP, indicating that the message is generated using the shared session information. The signed message is encrypted based on the shared symmetric key.

'sessionSharedKey' is recipient information included in the signed message after the session is established.

The ASN.1 format of the following table shows an example of modified recipient information based on IEE 1609.2b.

TABLE 7

```
RecipientInfo ::=
    CHOICE { pskRecipInfo PreSharedKeyRecipientInfo,
             symmRecipInfo SymmRecipientInfo,
             certRecipInfo PKRecipientInfo,
             signedDataRecipInfo PKRecipientInfo,
             rekRecipInfo PKRecipientInfo,
             sessionSharedKey SessionSharedKey
    }
SessionSharedKey::= SEQUENCE {
    sessionId    SessionId
    recipientId  HashedId8,
    encKey       HashedIId8
}
```

The asymmetric key encryption method utilizes certRecipInfo, but the proposed symmetric key encryption method utilizes a newly defined SessionSharedKey. 'encKey' may include a part of the shared symmetric key. For example, encKey may include 8 bytes of Least Significant Bit (LSB) of the symmetric key. 'recipientId' is a hash value of the recipient certificate of the message. The V2X server can acquire the shared symmetric key based on recipientId and sessionId. By comparing the obtained symmetric key with encKey, it is possible to check whether the obtained symmetric key is correct.

Steps S740 to S750 show an example of message exchange between the V2X device and the V2X server. The messages exchanged are generated and encrypted according to the format of the signed message described above.

In step S740, the V2X device sends a subscription request message for requesting subscription of the V2X service to the V2X server. The subscription request message may include information about the identifier, location, etc. of the V2X device. The V2X server may transmit a subscription response message for granting or rejecting subscription to the V2X device in response to the subscription request.

The V2X device can send the area setting related to the V2X service to the V2X server. The region setting may be included in a separate message or included in the subscription request. The area setting may include information about setting and/or changing the subscription area.

In step S750, the V2X device periodically or aperiodically transmits a V2X message to the V2X server. The V2X server may forward the received V2X message to a neighboring V2X device.

The V2X device performs signing and encryption for the V2X message as described above. IEEE 1609.2 of the V2X server performs decryption and verification (authentication) on the received V2X message and then delivers it to the message layer. When it is determined that the V2X message is to be forwarded to a neighboring V2X device, the message layer forwards this message to IEEE 1609.2. IEEE 1609.2 of the V2X server performs signing and encryption for the V2X message by using session information established with the neighboring V2X device. The V2X server transmits the encrypted V2X message to the neighboring V2X device.

According to the above-described embodiment, confidentiality and authentication can be performed using only IEEE 1609.2 over TCP/IP. A security session for encryption can also be established more quickly.

An established security session can be re-established: (1) when a certificate is changed, (2) when a TCP/IP session is established or re-established. The security session may be re-established in the same manner as in the process of establishing the initial session. The V2X device sends a signed ping request and receives a ping response.

According to the proposed embodiment, IEEE 1609.2 can be utilized as a security technology without TLS on a TCP/IP network.

TLS is designed primarily for X.509 certificates, and X.509 is a universal certificate that can be used for any application. X.509 has a long validity period and anonymity is not well guaranteed. On the other hand, the IEEE 1609.2 certificate guarantees anonymity and has a relatively short validity period. Therefore, the handshake process takes a lot of time because the certificate is frequently changed and the TLS session must be re-established frequently.

According to the proposed embodiment, it is possible to quickly establish a security session by reducing the negotiation process compared to the TLS handshake. TLS supports various algorithms and requires a negotiation process with each other, but IEEE 1609.2 uses a fixed algorithm and is suitable for V2X services. Compared to the asymmetric key method of TLS, ECIES used by IEEE 1609.2 can generate and share a symmetric key faster.

Legacy V2X technologies using traditional broadcast communications (e.g. DSRC or C-V2X) also use IEEE 1609.2 certificates. Therefore, it is convenient to secure compatibility by utilizing the existing IEEE 1609.2 certificate. Even if the existing broadcast communication and the proposed TCP/IP are supported at the same time, the modification of the upper layer (eg, the application layer) can be reduced and the reusability can be increased.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A device for establishing security session for vehicle-to-everything (V2X) service, the device comprising:
   a processor; and
   a memory operatively coupled with the processor and configured to store instructions that, when executed by the processor, cause the device to perform functions comprising:
   transmitting, to a V2X server, a ping request message for requesting an establishment of a security session, the ping request message including a certificate based on Institute of Electrical and Electronics Engineers (IEEE) 1609.2 and a session identifier (ID) for the security session, the certificate including a public key of the device;
   receiving, from the V2X server, a ping response message for establishing the security session as a response to the ping request message, the ping response message including an encrypted signed ping response, a public key of the V2X server and an encrypted symmetric key;
   obtaining a symmetric key by decrypting the encrypted symmetric key in the ping response message based on a private key of the device and the public key of the V2X server;
   obtaining a signed ping response by decrypting the encrypted signed ping response in the ping response message based on the symmetric key; and
   establishing the security session with the V2X server by confirming that the signed ping response includes a session ID which is set to a same value as the session ID of the ping requesting message.

2. The device of claim 1, wherein the functions further comprise:
   generating a V2X message, the V2X message including session shared key information and a signed message, the signed message being encrypted based on the symmetric key, the signed message including a V2X ID identifying the device and a position of the device, the session shared key information including the session ID of the ping response message and a part of the symmetric key; and
   transmitting, to the V2X server, the V2X message.

3. A non-transitory computer-readable medium having computer-readable instructions stored thereon that are executable by a processor to:
   transmit, to a V2X server, a ping request message for requesting an establishment of a security session, the ping request message including a certificate based on Institute of Electrical and Electronics Engineers (IEEE) 1609.2 and a session identifier (ID) for the security session, the certificate including a public key of a device;
   receive, from the V2X server, a ping response message for establishing the security session as a response to the ping request message, the ping response message including an encrypted signed ping response, a public key of the V2X server and an encrypted symmetric key;
   obtain a symmetric key by decrypting the encrypted symmetric key in the ping response message based on a private key of the device and the public key of the V2X server;
   obtain a signed ping response by decrypting the encrypted signed ping response in the ping response message based on the symmetric key; and
   establish the security session with the V2X server by confirming that the signed ping response includes a session ID which is set to a same value as the session ID of the ping requesting message.

4. The non-transitory computer-readable medium of claim 3, wherein the computer-readable instructions further comprise instructions for:
   generating a V2X message, the V2X message including session shared key information and a signed message, the signed message being encrypted based on the symmetric key, the signed message including a V2X ID identifying the device and a position of the device, the session shared key information including the session ID of the ping response message and a part of the symmetric key; and
   transmitting, to the V2X server, the V2X message.

5. The device of claim 2, wherein the session shared key information further includes a part of identification of the certificate based on IEEE 1609.2.

6. The device of claim 1, wherein the security session is established over transmission control protocol/internet protocol (TCP/IP).

7. The device of claim 1, wherein the functions further comprise:
   transmitting, to the V2X server, an updated ping request message for requesting an establishment of an updated security session when the certificate based on IEEE 1609.2 is changed.

8. The device of claim 1, wherein the symmetric key is obtained by decrypting the encrypted symmetric key in the ping response message by performing Elliptic Curve Integrated Encryption Scheme (ECIES) algorithm based on the private key of the device and the public key of the V2X server.

9. The non-transitory computer-readable medium of claim 4, wherein the session shared key information further includes a part of identification of the certificate based on IEEE 1609.2.

10. The non-transitory computer-readable medium of claim 3, wherein the security session is established over transmission control protocol/internet protocol (TCP/IP).

11. The non-transitory computer-readable medium of claim 3, the computer-readable instructions further comprise instructions for:
    transmitting, to the V2X server, an updated ping request message for requesting an establishment of an updated security session when the certificate based on IEEE 1609.2 is changed.

12. The non-transitory computer-readable medium of claim 3, wherein the symmetric key is obtained by decrypting the encrypted symmetric key in the ping response message by performing Elliptic Curve Integrated Encryption Scheme (ECIES) algorithm based on the private key of the device and the public key of the V2X server.

* * * * *